United States Patent
Suzuki

(10) Patent No.: US 9,570,898 B2
(45) Date of Patent: Feb. 14, 2017

(54) WIRE PROTECTION STRUCTURE

(71) Applicant: Yazaki Corporation, Minato-ku, Tokyo (JP)

(72) Inventor: Hiroyuki Suzuki, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 240 days.

(21) Appl. No.: 14/464,962

(22) Filed: Aug. 21, 2014

(65) Prior Publication Data

US 2014/0360774 A1 Dec. 11, 2014

Related U.S. Application Data

(63) Continuation of application No. PCT/JP2013/058451, filed on Mar. 15, 2013.

(30) Foreign Application Priority Data

Mar. 21, 2012 (JP) ................... 2012-063041

(51) Int. Cl.
*H05K 7/14* (2006.01)
*H02G 15/007* (2006.01)
(Continued)

(52) U.S. Cl.
CPC ............ *H02G 15/007* (2013.01); *H01R 13/52* (2013.01); *H01R 13/567* (2013.01); *H02G 15/10* (2013.01)

(58) Field of Classification Search
CPC ............ B60Q 7/00; B60Q 1/2611; F16B 5/12; F16L 3/12; F21K 9/00; F21S 4/003; F21S 4/008; F21S 4/005; F21S 4/20; F21S 4/22; F21S 4/28; F21S 8/10; F21S 10/06; F21S 48/30; F21V 7/0083; F21V 23/00; F21V 29/004;F21V 29/70; F21W 2101/00; F21Y 2101/00; F21Y 2101/02; F21Y 2105/001; F21Y 2105/10; F21Y 2115/10; G06F 1/181; H02G 3/14; H02G 3/30; H02G 3/088; H02G 15/10; H02G 15/007; H05K 7/00; H01R 13/42; H01R 13/46; H01R 13/52; H01R 13/56; H01R 13/506; H01R 13/562; H01R 13/567; H01R 13/648; H01R 13/748; H01R 13/5208; H01R 13/5213; H01R 24/00; H01R 31/02; H01R 31/08; H01R 2201/06; Y10S 362/80
(Continued)

(56) References Cited

U.S. PATENT DOCUMENTS 4,900,277 A 2/1990 Inaba et al.
6,259,033 B1 * 7/2001 Kassulat ................ H02G 3/088
174/151
(Continued)

FOREIGN PATENT DOCUMENTS

CN 101841103 A 9/2010
CN 102187528 A 9/2011
(Continued)

OTHER PUBLICATIONS

Search Report and Written Opinion issued in corresponding International Patent Application No. PCT/JP2013/058451 dated Jul. 9, 2013.
(Continued)

*Primary Examiner* — Timothy Thompson
*Assistant Examiner* — Guillermo Egoavil
(74) *Attorney, Agent, or Firm* — Banner & Witcoff, Ltd.

(57) ABSTRACT

A wire protection structure includes a housing, a holder that is received in the housing through an opening of the housing, a cover that covers at least a part of the opening of the
(Continued)

housing to define a wire-drawn port with the holder being received in the housing, and an electric wire that is drawn from the wire-drawn port. A flexible plate-shaped holder plate is provided to be extended from a surface of the holder toward the wire-drawn port. A deflection allowable space is formed between the holder plate and the housing to allow a deflection of the holder plate.

7 Claims, 5 Drawing Sheets

(51) Int. Cl.
*H01R 13/52* (2006.01)
*H01R 13/56* (2006.01)
*H02G 15/10* (2006.01)

(58) Field of Classification Search
USPC ... 49/319; 174/151, 659, 667, 542; 340/471, 340/472, 815.45; 362/35, 231, 240, 493, 513, 362/542, 545, 800; 439/271
See application file for complete search history.

(56) References Cited

U.S. PATENT DOCUMENTS

| | | | |
|---|---|---|---|
| 8,328,572 B2 | 12/2012 | Tashiro | |
| 2002/0131869 A1* | 9/2002 | Makino | F04B 35/04 417/53 |
| 2005/0099317 A1* | 5/2005 | Pederson | B60Q 1/2611 340/815.45 |
| 2010/0236151 A1 | 9/2010 | Chung | |
| 2011/0053398 A1* | 3/2011 | Arai | H01B 7/285 439/271 |
| 2011/0207354 A1 | 8/2011 | Tashiro | |

FOREIGN PATENT DOCUMENTS

| | | | |
|---|---|---|---|
| DE | 8913354 U1 | | 2/1990 |
| JP | S61-188204 U | | 11/1986 |
| JP | 11191442 A | * | 7/1999 |
| JP | H11-191446 A | | 7/1999 |
| JP | 2009193840 A | | 8/2009 |
| JP | 2011-054370 A | | 3/2011 |
| JP | 2011082113 A | | 4/2011 |

OTHER PUBLICATIONS

Dec. 2, 2015—(CN) Notification of the First Office Action—App 201380015038.X.
Jul. 7, 2015 (Issue Date)—(JP) Notification of Reasons for Refusal (Jun. 30, 2015 Drafting Date)—App 2012-063041.

* cited by examiner

WIRE PROTECTION STRUCTURE

CROSS REFERENCE TO RELATED APPLICATIONS

This application is a continuation of PCT application No. PCT/JP2013/058451, which was filed on Mar. 15, 2013 based on Japanese Patent Application (No. 2012-063041) filed on Mar. 21, 2012, the contents of which are incorporated herein by reference.

BACKGROUND OF THE INVENTION

1. Field of the Invention

The present invention relates to a wire protection structure, and more particularly to a wire protection structure, which is employed in a wire-drawn port of a housing.

2. Description of the Related Art

After terminal fittings are provided on terminal ends of electric wires and the terminal fittings are received in a housing, the electric wires become a state in which the electric wires are drawn from the housing (refer to JP-A-11-191446 and JP-A-2011-54370 as described below). In addition, if terminal ends of electric wires are connected to a board and the board is received in a housing, the electric wires in this case also become a state in which the electric wires are drawn from the housing.

SUMMARY OF THE INVENTION

If an external force is exerted to electric wires drawn from the housing, namely an external force pulling in a direction intersecting with a drawing direction of the electric wires to press the electric wires against an end of the housing is exerted to the electric wires, there is a risk of damaging the electric wires.

It is considered that such a damage can be easily caused when a load is applied to the electric wires within the housing. Specifically, it is considered that, for example, when the electric wires are forcibly bent within the housing by a holder and in a state in which such a load is applied to the electric wires, an external force is further exerted to the electric wires, the damage can be easily occurred.

Accordingly, the present invention has been made keeping in mind the above problems, and an object of the invention is to provide a wire protection structure, which can prevent electric wires from being damaged even when an external force is exerted to the electric wires.

A first aspect of the present invention provides a wire protection structure, including: a housing; a holder that is received in the housing through an opening of the housing; a cover that covers at least a part of the opening of the housing to define a wire-drawn port with the holder being received in the housing; and an electric wire that is drawn from the wire-drawn port, wherein a flexible plate-shaped holder plate is provided to be extended from a surface of the holder toward the wire-drawn port, and a deflection allowable space is formed between the holder plate and the housing to allow a deflection of the holder plate.

According to the configuration as above, when an external force is exerted to the electric wire drawn from the housing and at this time the electric wire is pressed against the holder plate, the holder plate can be deflected due to a presence of the deflection allowable space between the holder plate and the housing, and thus the pressing force can be relaxed due to such a deflection. As a result, even when the external force is exerted to the electric wire, a damage of the electric wire is not caused.

In a second aspect of the present invention, the wire protection structure may be configured so that a plurality of housing contact portions are provided on the holder plate to be protruding toward and contacting with the housing.

According to the configuration as above, the housing contact portions provided on the holder plate are contacted with the housing, so that when pressing to the electric wire is not present, an unnecessary deflection of the holder plate is not caused, and thus the electric wire can be drawn in a predetermined direction.

In a third aspect of the present invention, the wire protection structure may be configured so that the housing contact portions are respectively arranged at both sides of the deflection allowable space.

According to the configuration as above, an arrangement of the housing contact portions is prescribed, thereby ensuring a space for the deflection allowable space. Also, because the housing contact portions are provided at both sides of the deflection allowable space, the deflection of the holder plate can be stabilized.

In a fourth aspect of the present invention, the wire protection structure may be configured so that the housing contact portions are used as a portion for preventing the holder from being rattled within the housing.

According to the configuration as above, even if, for example, vibration or the like is transferred to the holder received in the housing, rattling of the holder can be prevented due to a presence of the housing contact portions provided on the holder plate.

According to the first aspect of the present invention, there is provided a structure including a flexible plate-shaped holder plate and a deflection allowable space for allowing a deflection of the holder plate, and thus even if an external force is exerted to an electric wire, the electric wire is pressed against the holder plate, not against the housing. Also, because the electric wire is pressed against the holder plate, a deflection is occurred in the holder plate, and thus the pressing force can be relaxed due to such a deflection. Therefore, there is achieved an effect that, by employing a structure in which the holder plate and the deflection allowable space are provided in a wire-drawn port, a damage of the electric wire can be prevented even when the external force is exerted to the electric wire.

According to the second aspect of the present invention, the following effect is also achieved in addition to the effect of the first aspect. Specifically, there is achieved an effect that housing contact portions are provided on the holder plate, thereby preventing an unnecessary deflection of the holder plate.

According to the third aspect of the present invention, the following effect is also achieved in addition to the effect of the second aspect. Specifically, there is achieved an effect that the housing contact portions are arranged at both sides of the deflection allowable space so that the deflection allowable space can be ensured, and thus the holder plate can be surely operated.

According to the fourth aspect of the present invention, the following effect is also achieved in addition to the effect of the second or third aspect. Specifically, there is achieved an effect that the housing contact portions are provided on the holder plate, thereby preventing rattling of the holder.

DETAILED DESCRIPTION OF THE EXEMPLARY EMBODIMENTS

A wire protection structure includes a flexible plate-shaped holder plate provided on a holder received in a housing, and a deflection allowable space formed between the holder plate and the housing. This wire protection structure is employed, for example, in a portion at which an electric wire is drawn from the housing.

First Embodiment

Figure 1:
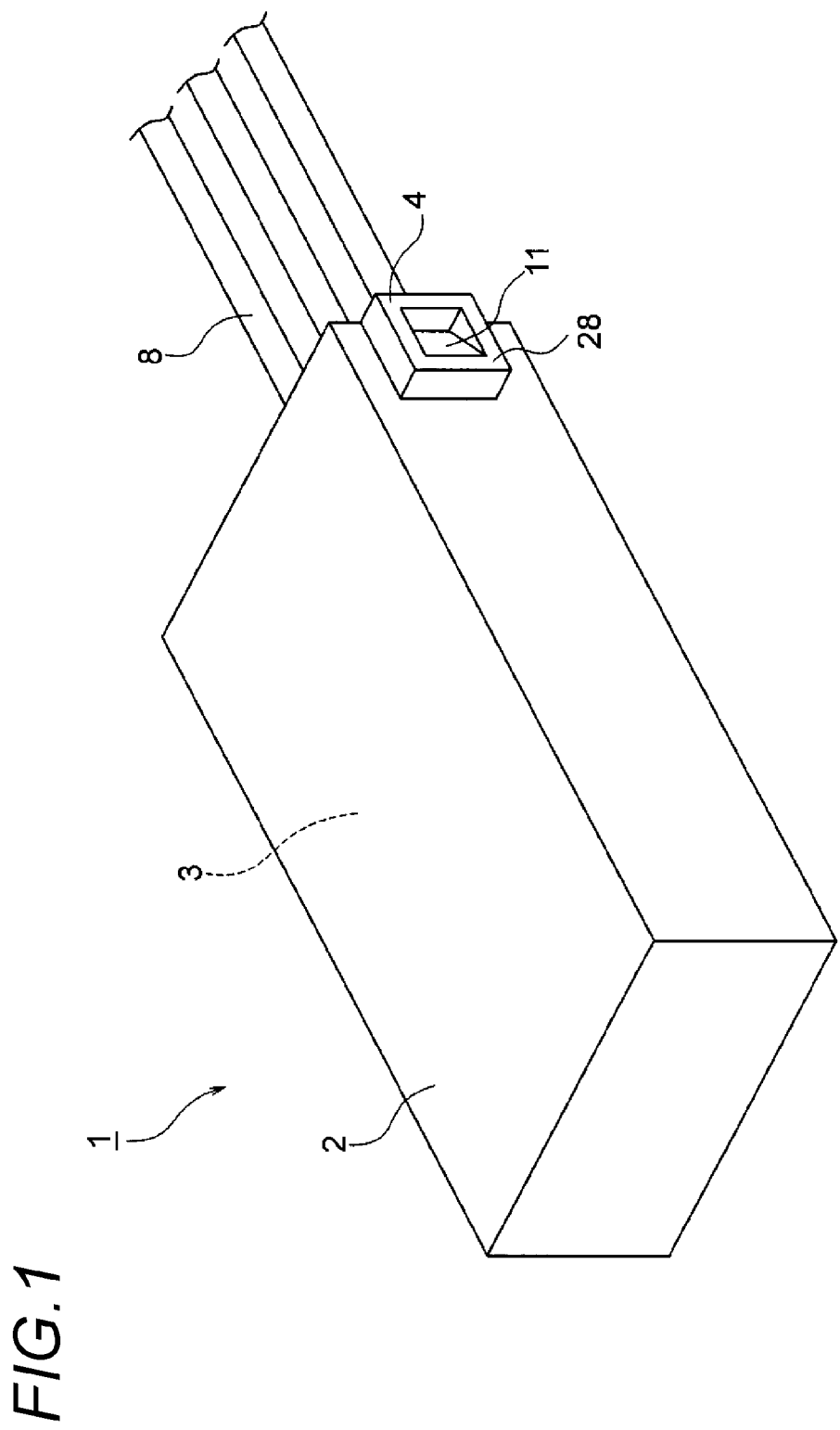
FIG. 1 is a perspective view showing a LED unit employing a wire protection structure according to a first embodiment of the present invention.
Figure 2:
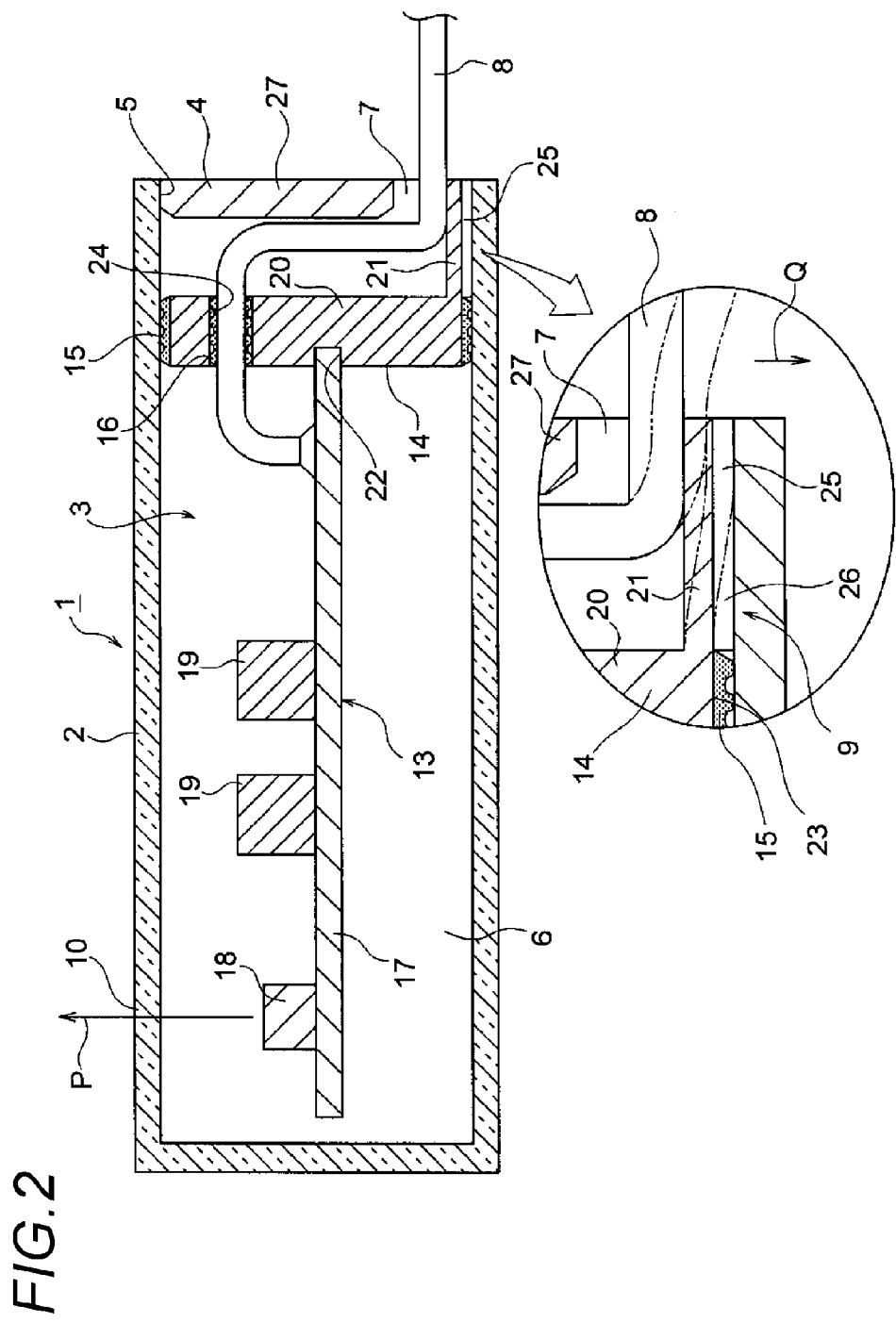
FIG. 2 is a longitudinal-sectional view of the LED unit of FIG. 1 (a portion within a circle is an enlarged sectional view of a main part thereof)
Figure 3A:
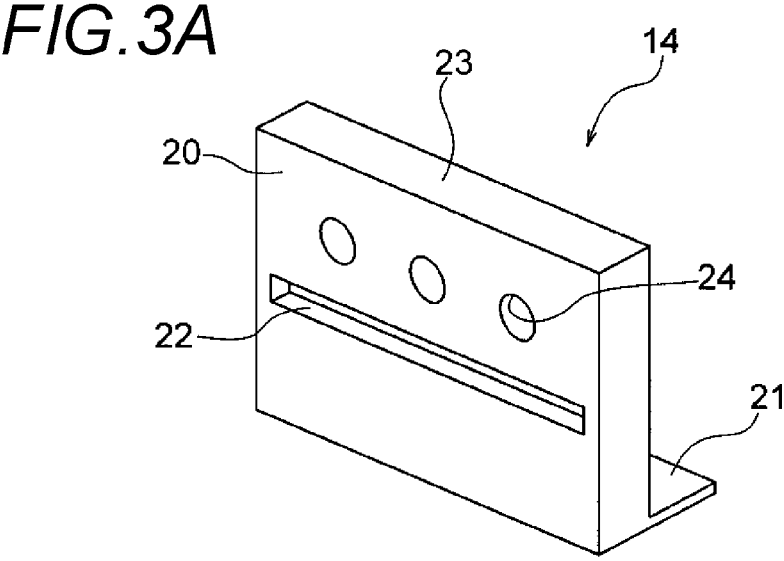
FIGS. 3A and 3B are perspective views of a holder.
Figure 3B:
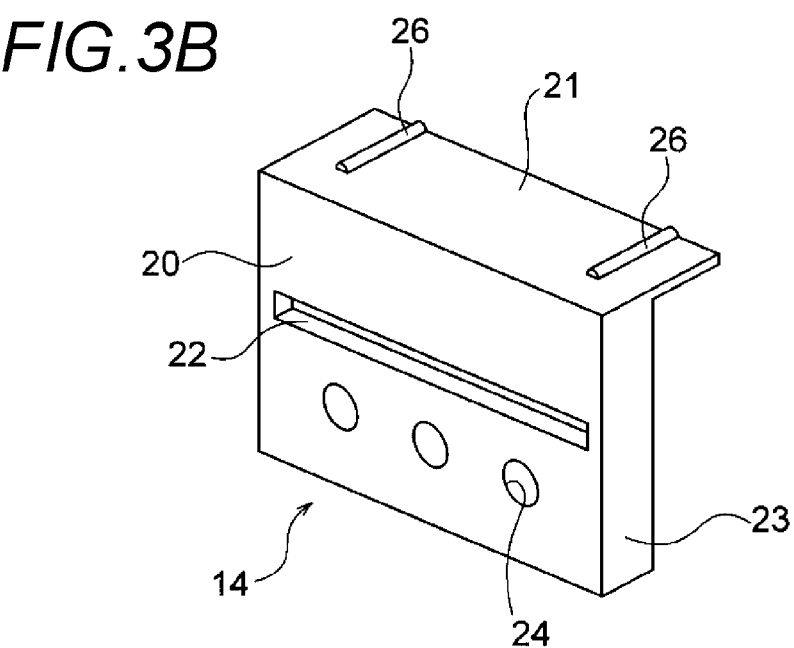
Figure 4A:
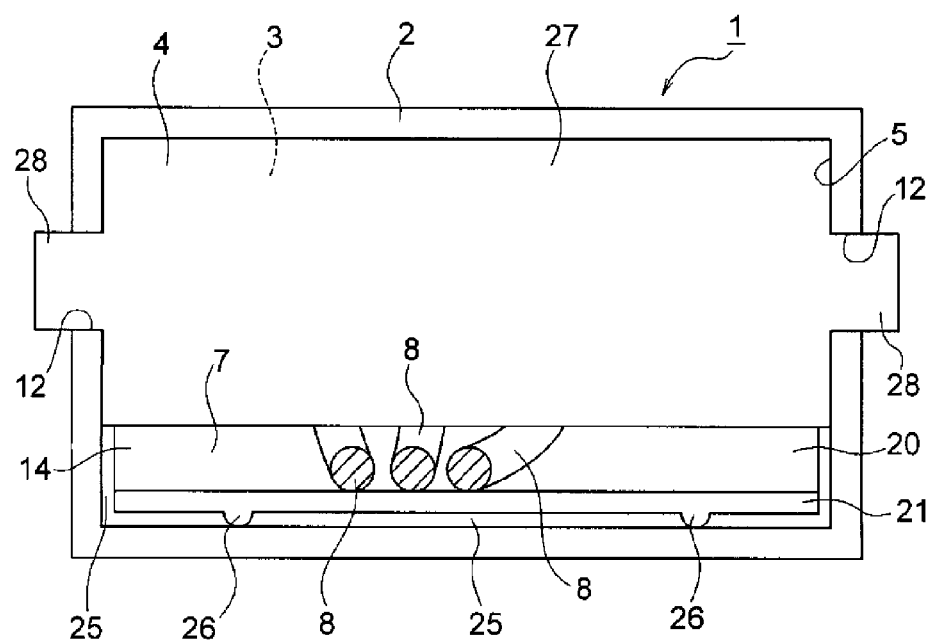
FIG. 4A is a rear view of the LED unit of FIG. 1.
Figure 4B:
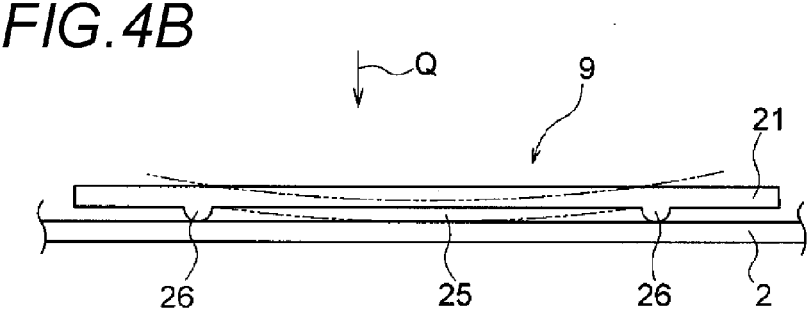
FIG. 4B is a diagram showing a holder plate and a deflection allowable space.

Hereinafter, a first embodiment will be described with reference to the drawings. FIG. 1 is a perspective view showing a LED unit employing a wire protection structure according to the first embodiment of the present invention. FIG. 2 is a longitudinal-sectional view of the LED unit, FIGS. 3A and 3B are perspective views of a holder, FIG. 4A is a rear view of the LED unit, and FIG. 4B is a diagram showing a holder plate and a deflection allowable space.

In the following description, specific shapes, materials, dimensions, directions and the like are shown as just examples for easy understanding of the present invention, and accordingly can be appropriately modified depending on applications, purposes, specifications and the like.

Also, in the following description, although a wire protection structure is employed in a LED unit, i.e., a LED unit mounted on a movable body, such as vehicles, the present invention is not limited to such a application. Specifically, the present invention can be employed in illumination units using light sources other than such LEDs, display devices having a light-emitting display, or the like. Besides, the present invention can be employed in connectors for performing electrical connection.

FIG. 1 shows a LED unit 1 employing the wire protection structure of the present invention. The LED unit 1 is, for example, provided to illuminate an object (not shown) to be illuminated in an interior of a vehicle. Also, the LED unit 1 may be mounted on electric vehicles or hybrid vehicles, and in this case can illuminate, for example, a power supply connector.

In FIGS. 1 and 2, the LED unit 1 includes a housing 2, a function part 3, and a cover 4. The function part 3 has a water-proof structure for preventing water or the like from being penetrated into a receiving space 6. The function part 3 is received into the receiving space 6 through an opening 5 opened in a rear portion of the housing 2. The opening 5 is covered with the cover 4 to define a wire-drawn port 7 leaved therein. A plurality of electric wires 8 connected to the function part 3 are drawn from the wire-drawn port 7. The wire protection structure 9 according to the first embodiment is provided in the vicinity of the wire-drawn port 7. Hereinafter, each of the above components will be described in detail.

The housing 2 is a resin molded component made of a synthetic resin material having light transmission properties and as described above, includes the opening 5 formed by opening the rear portion thereof, and the receiving space 6 defined therein. The housing 2 is transparent on the whole and has a box shape. A light transmitting portion 10 is formed on an upper wall of the housing 2. The light transmitting portion 10 corresponds to a portion at which an LED (Light Emitting Diode) 18 as described below is located. Also, an engaging protrusion 11 is formed on a rear portion of each of right and left side walls of the housing 2. The engaging protrusions 11 are formed as a portion for engaging with the cover 4.

Engaging recesses 12 (see FIG. 4) for engaging with base ends of engaging arms 28 (described below) of the cover 4 are respectively formed at locations of right and left edges of the opening 5 in the rear portion of the housing 2. The engaging recesses 12 are formed by cutting out the rear portions of the right and left side walls of the housing 2 in a recessed shape. A holder plate 21 as described below is disposed to oppose to a lower edge of the opening 5. The portion in which the holder plate 21 is disposed is included in the wire-drawn port 7.

The function part 3 includes a circuit board assembly 13, a holder 14, a water-proof packing 15, and a plurality of waterproof stoppers 16. The circuit board assembly 13 includes a board 17 having a desired circuit pattern, the LED 18, and electronic components 19. The LED 18 and the electronic components 19 are mounted on a surface (upper surface) of the board 17.

The board 17 is supported at opposing sides thereof by a support portion (not shown) formed on an inner surface of the housing 2. Also, the board 17 is held at a rear portion thereof by the holder 14. A plurality of electric wires 8 are connected to the board 17 by soldering. According to the present embodiment, the soldering connection portions are positioned close to the holder 14. The electric wires 8 are provided in plural for supplying a power as well as for signals.

The LED 18 has a light-emitting portion within a box-shaped package, and connected to the circuit pattern of the board 17. The LED 18 emits light in a direction of an arrow P to illuminate an object (not shown) to be illuminated. Meanwhile, it is noted that the arrangement of the LED 18 in the drawings is one example. Also, it is noted that the number of the LEDs 18 is not limited to one, but any number.

The holder 14 is a resin molded component made of a synthetic resin material and includes a holder body 20 and the holder plate 21. The holder body 20 is formed to have an outer circumference slightly smaller than an inner circumference of the housing 2 and thereby to create a gap therebetween. The gap is water-tightly filled up with the water-proof packing 15.

In FIGS. 2, 3A and 3B, the holder body 20 is provided with a board holder portion 22, a packing attaching portion 23, and a plurality of wire insertion holes 24. The board holder portion 22 is formed as a portion for holding a rear portion of the board 17.

The packing attaching portion 23 is a portion on which the water-proof packing 15 is attached, and corresponds to the outer circumference of the holder body 20. The outer circumference of the holder body 20, i.e., the packing attaching portion 23, and the inner circumference of the housing 2 are formed as seal surfaces and closely contacted with the water-proof packing 15. The water-proof packing 15 is molded in an annular shape using a water stopping material, such as a rubber. The water-proof packing 15 has elasticity. The water-proof packing 15 is provided with a plurality of lip portions.

The wire insertion holes 24 are portions into which the electric wires 8 having the waterproof stoppers 16 previously attached thereon are inserted, and are through-formed in a circular. Inner surfaces of the wire insertion holes 24 are formed as seal surfaces and closely contacted with the waterproof stoppers 16. The waterproof stoppers 16 are molded in a generally cylindrical shape using a water stopping material, such as a rubber. The waterproof stoppers 16 have elasticity. The waterproof stoppers 16 are provided with a plurality of lip portions.

The holder plate 21 is a plate-shaped portion which extends from a lower portion of the holder body 20 toward the wire-drawn port 7, and has a thickness significantly thinner than the holder body 20, thus having flexibility. According to the present embodiment, the holder plate 21 is formed in the same width as that of the holder body 20 (this is one example. It is noted that the width dimension can be set depending on the number of electric wires 8 and a deflection state.

On a surface (upper surface) of the holder plate 21, the electric wires 8 forcibly bent by the holder body 20 are placed. According to the present embodiment, the surface of the holder plate 21 is formed in a smooth flat surface. A back surface (lower surface) of the holder plate 21 opposes to a lower wall of the housing 2 in a state parallel to each other (i.e., the back surface opposes to an inner surface of the inner wall, starting from a lower edge of the opening 5).

In FIGS. 2, 4A, and 4B, the back surface of the holder plate 21 opposes to the lower wall of the housing 2 so that a deflection allowable space 25 is formed therebetween. The deflection allowable space 25 is formed as a space for allowing a deflection of the holder plate 21.

On the back surface of the holder plate 21, a pair of housing contact portions 26 protruding toward the lower wall of the housing 2 are formed. The housing contact portions 26 are integrated with the back surface and respectively arranged at both sides of the deflection allowable space 25. The housing contact portions 26 are formed to protrude in contact with the lower wall of the housing 2. According to the present embodiment, the housing contact portions 26 are formed in a rib shape straightly extending from a location, at which the holder body 20 and the holder plate 21 are continued to each other, toward the wire-drawn port 7.

Meanwhile, if the deflection allowable space 25 can be ensured, the shape of the housing contact portions 26 is not particularly limited. According to the present embodiment, the housing contact portions 26 is formed in a semicircular rib shape, but may be formed, for example, in a triangle rib shape. In addition, instead of such rib shapes, the housing contact portions 26 may have, for example, a hemispherical projection shape. Preferably, the housing contact portions 26 have such a shape and number that deflection of the holder plate 21 can be stabilized.

Deflection of the holder plate 21 is mainly allowed by the deflection allowable space 25 between the housing contact portions 26. The holder plate 21 integrally has the housing contact portions 26, thereby regulating an unnecessary deflection. Namely, a required rigidity is ensured. Due to such a rigidity, a drawing direction of the electric wires 8 in a normal state can be stabilized.

Now, deflection state of the holder plate 21 will be described with reference to FIGS. 2 and 4B.

The electric wires 8 forcibly bent by the holder body 20 are placed on the surface (upper surface) of the holder plate 21. If an external force pulling downward as shown by an arrow Q is exerted to the electric wires 8, a deflection as shown by phantom lines in the figures is occurred on the holder plate 21. The deflection is a deflection in which a distal end of the holder plate 21 is obliquely inclined toward the lower wall of the housing 2, when viewed in FIG. 2, but a deflection in which the holder plate 21 is curved in an arc shape, when viewed in FIG. 4B. Due to such a deflection state, a pressing force in a downward direction can be significantly relaxed, as compared to when the holder plate 21 is not present. As a result, even when the external force is exerted to the electric wires 8, a damage of the electric wires 8 is not caused.

The holder plate 21 and the deflection allowable space 25 constitute the wire protection structure 9. In addition, the housing contact portions 26 may also constitute the wire protection structure 9.

In FIGS. 2 and 4A, the cover 4 is a resin molded component made of a synthetic resin material and includes a cover body 27 and a pair of engaging arms 28. The cover body 27 is formed as a portion which covers the opening 5 to defined the wire-drawn port 7 leaved therein. The engaging arms 28 are formed to be continued from right and left sides of the cover body 27. The engaging arms 28 are engaged with the engaging protrusions 11 of the housing 2 and formed in a generally frame shape. The engaging arms 28 have flexibility. The base ends of the engaging arms 28 are inserted and engaged in the engaging recesses 12 of the housing 2. When engaging to the housing 2, the cover 4 covers rear sides of the bent portions of the electric wires 8, so that the bent shape thereof can be kept. The cover 4 is a so-called rear holder.

Features of the present invention based on the foregoing configurations and structures can be summarized as follows. Specifically, the wire protection structure 9 according to the embodiment is employed to the LED unit 1 including electric wires 8, the board 17 becoming a connection target for the electric wires 8, the housing 2 that receives the board 17, the holder 14 that is received behind the board 17 through the opening 5 of the housing 2, and the cover 4 for covering the a part of the opening 5 of the housing 2 to define a wire-drawn port 7 leaved therein with the holder 14 being received. Then, a flexible plate-shaped holder plate 21 extending toward the wire-drawn port 7 is provided on the holder 14, and a deflection allowable space 25 for allowing a deflection of the holder plate 21 is provided between the holder plate 21 and the housing 2.

Also, a pair of housing contact portions 26 protruding toward and contacting with the housing 2 are provided on the holder plate 21. In addition, the housing contact portions 26 are respectively arranged at both sides of the deflection allowable space 25.

According to the above features, the following effects are achieved. Specifically, even if an external force is exerted to the electric wires 8, a damage of the electric wires 8 can be prevented.

In addition, when the housing contact portions 26 are used as a portion for preventing the holder 14 from being rattled within the housing 2, rattling of the holder 14 can be prevented even if vibration or the like is transferred thereto.

Second Embodiment

Figure 5A:
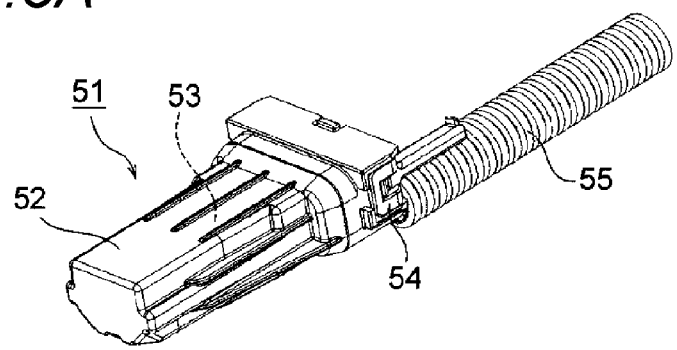
FIG. 5A is a perspective view of a LED unit as a specific example (a second embodiment)
Figure 5B:
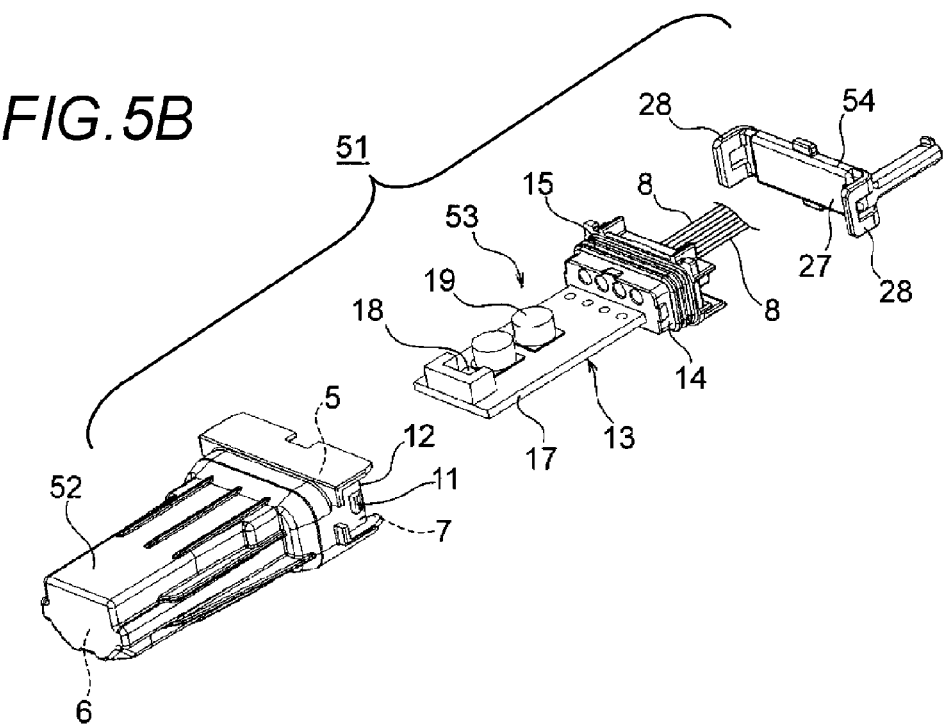
FIG. 5B is an exploded perspective view thereof.
Figure 5C:
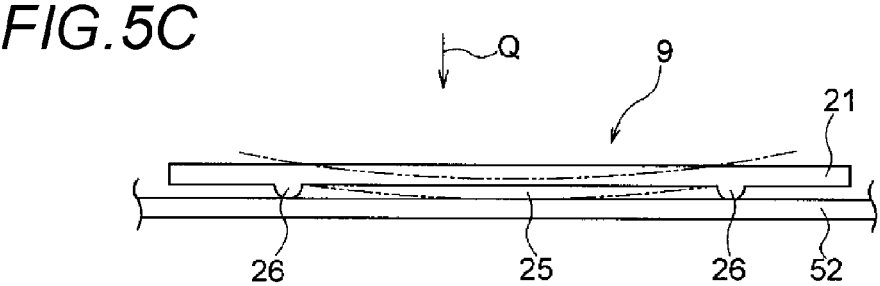
FIG. 5C is a diagram showing a holder plate and a deflection allowable space.

Hereinafter, a second embodiment will be described with reference to the drawings. FIGS. 5A to 5C are diagrams showing an LED unit as a specific example, in which FIG. 5A is a perspective view thereof, FIG. 5B is an exploded perspective view thereof, and FIG. 5C is a view showing a holder plate and a deflection allowable space.

In FIGS. 5A to 5C, the second embodiment is an example in which the shape of the LED unit 1 (see FIGS. 1 and 2) of the first embodiment is further specified, and here, an LED unit 51 includes a housing 52, a function part 53 and a cover 54. A function of each of such components is the same as those of the first embodiment. Specifically, the function part 53 is received into a receiving space 6 through an opening 5 opened in a rear portion of the housing 52. The opening 5 is covered with the cover 54 to define a wire-drawn port 7 leaved therein. A plurality of electric wires 8 connected to the function part 53 are drawn from the wire-drawn port 7. The electric wires 8 are received in a corrugated tube 55 to be protected from the outside.

A wire protection structure 9 provided in the wire-drawn port 7 includes the holder plate 21 of the holder 14 constituting the function part 53, the deflection allowable space 25 for allowing a deflection of the holder plate 21, and housing contact portions 26 formed to protrude from the holder plate 21. The wire protection structure 9 of the second embodiment also has the same operation and effects as those of the first embodiment.

In addition, various modifications can, of course, be made in the present invention within a range without changing the spirit of the present invention.

A wire protection structure according to the present invention is useful because it prevents electric wires from being damaged even when an external force is exerted to the electric wires.

What is claimed is:

1. A wire protection structure, comprising:
   a housing;
   a holder that is received in the housing through an opening of the housing;
   a cover that covers at least a part of the opening of the housing to define a wire-drawn port with the holder being received in the housing; and
   an electric wire that is drawn from the wire-drawn port, wherein:
      a flexible plate-shaped holder plate is provided to be extended from a surface of the holder toward the wire-drawn port,
      a plurality of housing contact portions are provided on the holder plate to be protruding toward and contacting with the housing, and
      a deflection allowable space is formed between the holder plate and the housing to allow a deflection of the holder plate.

2. The wire protection structure according to claim 1, wherein the housing contact portions are respectively arranged at both sides of the deflection allowable space.

3. The wire protection structure according to claim 1, wherein the housing contact portions are used as a portion for preventing the holder from being rattled within the housing.

4. The wire protection structure according to claim 1, wherein the electric wire is drawn out from the wire-drawn port in a same direction as a direction in which the holder plate extends from the surface of the holder.

5. A wire protection structure, comprising:
   a housing;
   a holder that is received in the housing through an opening of the housing;
   a cover that covers at least a part of the opening of the housing to define a wire-drawn port with the holder being received in the housing; and
   an electric wire that is drawn from the wire-drawn port, wherein:
      a flexible plate-shaped holder plate is provided to be extended from a surface of the holder toward the wire-drawn port, and
      a deflection allowable space is formed, in a direction perpendicular to the direction in which the electric wire is drawn from the wire-drawn port, between the holder plate, when in a non-deflected state, and the housing to allow a deflection of the holder plate.

6. A wire protection structure, comprising:
   a housing;
   a holder that is received in the housing through an opening of the housing;
   a cover that covers at least a part of the opening of the housing to define a wire-drawn port with the holder being received in the housing; and
   an electric wire that is drawn from the wire-drawn port, wherein:
      the holder comprises a holder body and a flexible plate-shaped holder plate is provided to be extended from a surface of the holder body toward the wire-drawn port, and
      a waterproof packing is attached to an outer circumference of the holder body to fill a gap between the outer circumference of the holder body and an inner circumference of the housing in a watertight manner, whereby a deflection allowable space is formed between the holder plate and the housing to allow a deflection of the holder plate.

7. The wire protection structure according to claim 1, wherein the holder comprises a holder body from which the holder plate extends toward the wire-drawn port such that the holder plate is disposed in the wire-drawn port, and
   wherein the holder plate comprises a surface on which the electric wire bent by the holder body is placed and a back surface that opposes a wall of the housing, the deflection allowable space being formed between the back surface of the holder plate and the wall of the housing.

* * * * *